United States Patent [19]

Bellos

[11] 4,404,362
[45] Sep. 13, 1983

[54] BLOCK POLYMERS OF ALKANOLAMINES

[75] Inventor: Thomas J. Bellos, Kirkwood, Mo.

[73] Assignee: Petrolite Corporation, St. Louis, Mo.

[21] Appl. No.: 330,118

[22] Filed: Dec. 14, 1981

[51] Int. Cl.$^3$ .............................................. C08G 73/02
[52] U.S. Cl. ..................................... 528/422; 252/344; 525/440
[58] Field of Search ................... 525/540, 50; 528/422

[56] References Cited

U.S. PATENT DOCUMENTS

| Re. 22,963 | 1/1948 | Monson et al. | 252/344 |
| 2,011,064 | 8/1935 | Mattox | 528/422 |
| 2,407,895 | 9/1946 | Monson et al. | 252/344 |

FOREIGN PATENT DOCUMENTS 1099065  1/1968  United Kingdom ................ 528/422

Primary Examiner—Wilbert J. Briggs, Sr.
Attorney, Agent, or Firm—Sidney B. Ring; Leon Zitver

[57] ABSTRACT

This invention relates to block polymers of polyalkanolamine, for example a polymer where one block is polyethanolamine and the other block is polypropanolamine, etc.; and to uses thereof, for example as demulsifiers.

19 Claims, No Drawings

BLOCK POLYMERS OF ALKANOLAMINES

Heretofore, alkanolamines have been condensed by dehydration to yield condensates or polymers. This is illustrated in U.S. Pat. No. 2,407,895 and U.S. Pat. No. Re. 22,963.

I have now discovered that one species of alkanolamines can be condensed by dehydration to yield one condensate or polymer A; and another species of alkanolamines can be condensed by dehydration to yield a second condensate or Polymer B; and then Polymer A and Polymer B can be combined and further condensed to yield a block AB Polymer which has improved properties over either Polymer A or Polymer B.

If desired, more than two polymers can be combined so as to yield for example more than 2 blocks, such as ABC, ABCD . . . , etc., ABCD . . . Z.

This invention may be illustrated by the block polymerization of (1) A polyalkanolamine of one type with (2) a polyalkanolamine of a second type to yield an improved product;

For example, where (1) polyethanolamines condensate are condensed by dehydration, and (2) polypropanolamines condensate are condensed by dehydration, and (3) the resulting products (1) and (2) are then blended with each other and condensed by dehydration; the resulting yields an improved product. The alkanolamines usable as starting materials include polyamines as well as monoamines, and may be cyclic. Combinations of different amines may also be employed.

The invention will be illustrated by

I. Triethanolamine (TEA) alone or TEA in combination with other related component(s) thereof such as diethanolamine (DEA), and II. Tripropanolamines (TPA) alone or TPA in combination with other related component(s) thereof such as dipropanolamines (DPA), or the corresponding isopropanolamines.

I is condensed by dehydration;

II is condensed by dehydration; and

I and II are blended and further condensed by dehydration.

The products of this invention may be prepared by the methods of U.S. Pat. No. 2,407,895 and U.S. Pat. No. Re. 22,963, or to yield products of controlled molecular weights as described in Ser. No. 264,506 filed May 18, 1981.

The polymers of this invention are prepared by heating an alkanolamine in the presence of an effective amount of catalyst. In general, the catalyst present is about 0.01 to 5.0% by weight of the alkanolamine, but preferably about 0.01 to 1.25%.

Examples of catalysts include the following: $ZnCl_2$, $MgSO_4$, $Al_2(SO_4)_3$, individually or with a co-catalyst(s), e.g., acetic acid, sulfuric acid, p-toluenesulfonic acid, phosphoric.

The ratio of Polymer A to Polymer B can vary widely depending on the particular alkanolamine, the intended use, etc., in general from about 5 to 95% by wgt., such as from about 15 to 75%, such as from about 25 to 50%, but preferably from about 10 to 60%. If Polymer C is employed, the optimum ratio may be determined by the components and the desired use.

The reaction is heated at a temperature and time sufficient to yield the product having the desired viscosity and thus the desired molecular weight. The preferred viscosity at 50% by weight at 100° F. is from about 65 sus to 950 sus, for example from about 70 to 750, but preferably from about 70 to 500 sus.

The time of reaction is that sufficient to achieve the desired molecular weight, such as from about 7 to 12 hrs., for example from about 5 to 11, but preferably from about 4 to 10 hrs. But in actuality the products are prepared to a viscosity specification and/or a % theoretical dehydration. To manufacture the products of this invention it is desirable to control the viscosity of the reaction product. The reactor is outfitted with a commercial device capable of rendering meaningful viscosity of the reaction at reaction temperature. Therefore, this instrument must be capable of measuring with reasonable accuracy viscosity between 2.5-100 cp. With the viscosity device in place in the reactor manufacturing is made typically in the following fashion.

The alkanolamine is charged to a reactor outfitted with axial and/or radial mixing but not limited to this type. The catalyst and/or catalysts are added and while stirring the reactor is heated to the designated reaction temperatures, e.g., 220°-290° C. and allowed to react. The process of the reaction condenses the alkanolamine via dehydration but more complex chemical reaction are involved since organic species (by-products) that are decomposition products of the alkanolamine are found in the condensate that distill from the reaction. The reaction can be monitored in two methods but not limited to these methods. First, for a given reactor charge a specific amount of condensate will distill off the media. Therefore, the desired product could be made by weighing the condensate until the desired amount had been removed. The more accurate method would be to measure the viscosity of the product stopping at the desired viscosity experimentally determined.

The following examples are presented by way of illustration and not of limitation. All parts are by weight.

EXAMPLE I 300 parts by weight of triethanolamine (TEA) were charged to an autoclave outfitted with a condenser and an apparatus for determining the viscosity of the reaction product. The TEA was catalyzed with iron chloride and heated to 250° C. while stirring. As the product condensed by dehydration the viscosity was monitored. Based on predetermined viscosities, TEA was condensed to a point where 50% by weight of the theoretical water capable of being removed by condensation before the amine would crosslink into a rubber like water insoluble substance ("rubber point"). Since in this example 54 g of condensate represents the rubber point, 50% of the theoretical water would be represented by 27 g of condensate, which was removed. The viscosity as well as the amount of condensate was noted. This product was called "A".

EXAMPLE II 300 parts of triisopropanolamine catalyzed with iron chloride were charged to an autoclave outfitted with a condenser and an apparatus for determining viscosity. The autoclave was heated to 240° C. while stirring and 60% by weight of the theoretical water was removed by condensation after which the reactor was immediately cooled. This is "B".

EXAMPLE III 150 parts of A were combined with 150 parts of B in an autoclave outfitted with a condenser and viscosity monitoring apparatus. While stirring, the autoclave was heated to 220° C. and water condensation observed. At regular condensate intervals, small samples were removed from the autoclave noting the viscosity and the condensate level for each sample. The last or final sample represents a condensate level 5–10% below the "rubber point" of condensation.

EXAMPLE IV 280 parts by weight of N,N'di(2-hydroxyethyl)piperazine was catalyzed and condensed to a level where 75% of the theoretical water was removed. 150 parts of this condensate were reacted with 100 parts of example II and condensed to a level within 5–10% of the rubber point.

EXAMPLE V 400 parts of benzylamine that was modified with ethylene and propylene oxide, e.g., one mole benzylamine, two moles of ethylene oxide and one mole of propylene oxide. This product was catalyzed and condensed to 40% of the rubber point. 200 parts of this product were condensed with 100 parts of Example I to a point where 72% of the theoretical water was removed.

EXAMPLE VI 500 parts N,N-di(2-hydroxyethyl)-N-2 hydroxypropyl amine was catalyzed with $ZnCl_2$ and condensed to a level of 60% of the total theoretical water in the manner of Example I. 300 parts of this product were condensed with 100 parts of benzylamine (1 mole) that had been modified with 2 moles of ethylene oxide and 1 mole of propylene oxide that had been condensed to 60% of the rubber point.

EXAMPLE VII

Ethylene diamine (1 mole) was modified with two moles of ethylene oxide and two moles of propylene oxide. This product was catalyzed with $ZnCl_2$ and acetic acid and condensed via dehydration to a level of 65% of the rubber point.

EXAMPLE VIII 200 parts of Example VII were mixed with 100 parts of N,N-di(2-hydroxyethyl)-N-2-hydroxypropyl amine that had been condensed to 60% of the rubber point. Prior to heating, thirty parts of acetic acid were added to the mixture. The autoclave was heated to 235° C. with an open condenser outfitted with a trap for weighing the condensate. Twenty-five parts of condensate were collected after which the reaction was discontinued.

EXAMPLE IX

A reaction was carried out as in Example VIII except the reaction was monitored by viscosity apparatus. The reaction was continued to a point where the viscosity exceeded 5.0 cp at a reaction temperature of 230° C. but was less than 100 cp at the completion of said reaction.

The products may be used as their quaternary ammonium salts, salts of inorganic and organic acids, complexes with salts, e.g., complexes with metal such as $ZnCl_2$, etc.

In certain instances salts and/or quaternaries of the condensates of this invention can be employed.

For example any of the above condensates can be quaternized with any alkyl halide.

Suitable alkyl halides include alkyl groups having from 1 to 18 carbons, but preferably lower alkyl groups, i.e., from 1 to 8 carbons, methyl, ethyl, propyl, etc. chlorides.

Depending on the product and the system in which it is employed, the amount of amino group present in the polyamine can be widely quaternized. In general, the quaternization can vary from about 25% to 100% quaternized, such as from about 50 to 100% quaternized, for example from about 83 to 87%, but preferably from about 75.0 to 96.0%.

The above percentage relates to the number % of nitrogen atoms quaternized.

This phase of the invention relates to a process for resolving or separating emulsions of the oil-in-water class, by subjecting the emulsion to the action of the demulsifiers of this invention.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; oil-in-water emulsions occurring in the cooling water systems of gasoline absorption plants; emulsions of petroleum residues-in-diethylene glycol, in the dehydration of natural gas, etc.

In other industries and arts, emulsions of oily materials in water or other non-oily media are encountered, for example, in sewage disposal operations, milk and mayonnaise processing, marine ballast water disposal. In cleaning the equipment used in processing such products, diluted oil-in-water emulsions are inadvertently, incidentally, or accidentally produced. The disposal of aqueous wastes is, in general, hampered by the presence of oil-in-water emulsions.

Steam distillation and other production procedures sometimes cause oil-in-water emulsions to be produced, from which the valuable oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

Among the most important emulsions of non-saponificable material in water are petroleum oil-in-water emulsions.

Oil-in-water emulsions contain widely different proportions of dispersed phase. Where the emulsion is a waste product resulting from the flushing with water of manufacturing areas or equipment, the oil content may be only a few parts per million. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million.

Although the present invention relates to emulsions containing as much as 20% dispersed oily material, many, if not most of them, contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed.

This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

The present process, as stated above, appears to be effective in resolving emulsions containing up to about 20% of dispersed phase. It is particularly effective on emulsions containing not more than 1% of dispersed phase, which emulsions are the most important, in view of their common occurrences.

Some emulsions are by-products of manufacturing procedures in which the composition of the emulsion and its ingredients is known. In many instances, however the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of a demulsifier of the kind herein described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The present reagents are useful, because they are able to recover the oil from oil-in-water class emulsions more advantageously and at lower cost than is possible using other reagents or other processes. In some instances, they have been found to resolve emulsions which were not economically or effectively resolvable by any other known means.

The demulsifier may be employed alone, or they may in some instances be employed to advantage admixed with other and compatible oil-in-water demulsifiers.

The process is commonly practised simply by introducing small proportions of demulsifier into an oil-in-water-class emulsion, agitating to secure distribution of the reagent and incipient coalescence, and letting stand until the oil phase separates. The proportion of demulsifier required will vary with the character of the emulsion to be resolved. Ordinarily, proportions of reagent required are from 1/5,000 to 1/1,000,000 the volume of emulsion treated; but more is sometimes required.

In some instances, importantly improved results are obtained by adjusting the pH of the emulsion to be treated, to an experimentally determined optimum value.

The demulsifier feed rate also has an optimum range, which is sufficiently wide, however, to meet the tolerances required for the various encountered daily in commercial operations. A large excess of reagent can produce distinctly unfavorable results.

The manner of practising the present invention is clear from the foregoing description.

The process is commonly practised simply by introducing small proportions of our demulsifier into an oil-in-water class emulsion, agitating to secure distribution of the reagent and incipient coalescence, and letting the mixture stand until the oil phase separates. The proportion of demulsifier required will vary with the character of the emulsion to be resolved. Ordinarily proportions of reagent required are from about 1/10,000 to about 1/1,000,000 the volume of emulsion treated; but more or less may be required.

A preferred method of practising the process to resolve a petroleum oil-in-water emulsion is as follows: Flow the oil well fluids, consisting of free oil, oil-in-water emulsion, and natural gas, through a conventional gas separator, then to a conventional steel oil-field tank, of, for example, 5,000-bbl. capacity. In this tank the oil-in-water emulsion falls to the bottom, is withdrawn, and is so separated from the free oil. The oil-in-water emulsion, so withdrawn, is subjected to the action of our reagent in the desired small proportion, injection of reagent into the stream of oil-in-water emulsion being accomplished by means of a conventional proportioning pump or chemical feeder. The proportion employed in any instance is determined by trial-and-error. The mixture of emulsion and reagent then flows to a pond or sump wherein it remains quiescent and the previously emulsified oil separates, rises to the surface, and is removed. The separated water, containing relatively little to substantially none of the previously emulsified oil, is thereafter discarded.

The following will illustrate the operating steps employed to resolve an emulsion of the oil-in-water class by use of a demulsifier of this invention.

In order to test the demulsifier of this invention a natural crude petroleum oil-in-water emulsion is subjected to the action of the demulsifier of this invention at the concentration (ppm) indicated. Thus, a mixture of emulsion and demulsifiers is agitated for the time (in minutes), and then allowed to stand quiescent and read. A check or control sample of the same emulsion is processed the same way except that no demulsifier is added to it.

Throughout the foregoing description, we have referred to "oil" and to "water." By "oil" we mean an oily, non-aqueous liquid which is not soluble in or miscible with water. By "water" we mean water, aqueous solutions, and any non-oily liquid which is not soluble in or miscible with oils.

The results are presented in the following tables. All tests were carried out at ambient temperatures. The results of the tests were read and rated as follows:
 B=Bad—no visible resolution of emulsion
 P=Poor—some oil breaking from emulsion
 F=Fair—noticeable change in emulsion
 G=Good—free oil, good water
 E=Excellent—oil free from water, water clear.

The following tests were conducted on a mechanical shaking machine. One hundred milliliters of test oil-field emulsion were treated with from 2 to 40 ppm of experimental demulsifier. The samples were capped and agitated for 10 minutes after which the bottles were viewed and graded according to their appearance.

The following is presented to show the difference between the effectiveness of the present invention, prior art products of similar viscosities, but prepared with different catalysts.

TABLE I

Resolution of a Los Angeles, California Oilfield Emulsion after 10 minutes agitation:

| | | | ppm Chemical - Results | | | | | | | |
|---|---|---|---|---|---|---|---|---|---|---|
| Ex. | Product | | 2 | 4 | 6 | 10 | 12 | 14 | 20 | 30 | 40 |
| 1 | Blank | 100 ml test water | B | B | B | B | B | B | B | B | B |
| 2 | Example III* | " | B | P | F− | G− | G | E | E | G− | F+ |
| 3 | Example IV* | " | B | P+ | F+ | B | G | E− | E− | F+ | P |
| 4 | Example V* | " | B | P | P | F+ | F+ | F | P | P | P |
| 5 | Example VI* | " | B | P+ | P+ | F+ | G+ | E | G | F+ | F− |
| 6 | Example VIII* | " | B | P+ | G+ | E− | E | G | G | F+ | F |
| 7 | Example IX* | " | B | P | E | G+ | F+ | F | P+ | P+ | P+ |

*All examples were first converted to their quaternary ammonium salts via methyl chloride to a level of 75–96% (quaternary)

The compositions of this invention are particularly effective in flotation systems. This invention may be used singly or in combination with other organics and/or inorganics to enhance their activity.

REMOVAL OF OILS AND SOLIDS FROM AQUEOUS SYSTEMS

In the present process, to remove oils, or solids, or combinations thereof, from aqueous systems, the reagent is introduced at any convenient point in the system, and it is mixed with the oils or solids in any desired manner, such as by being pumped or circulated through the system or by mechanical agitation such as paddles or by gas agitation. After mixing, the mixture of oils or solids and reagent is allowed to stand quiescent until the constituent phases of the emulsion separate. Settling times and optimum mixing times will, of course, vary with the nature of the oil or solid and the apparatus available. The operation, in its broadest concept, is simply the introduction of the reagent into the oils or solids, the mixing of the two to establish contact and promote coalescence, and, usually, the subsequent quiescent settling of the agitated mixture, to produce the aqueous and non-aqueous phases as stratified layers.

Agitation may be achieved in various ways. The piping system through which the oil- or solids-containing system passed during processing may itself supply sufficient turbulence to achieve adequate mixing of reagent and system. Baffled pipe may be inserted in the flow sheet to provide agitation. Other devices such as perforated-chamber mixers, excelsior- or mineral- or gravel- or steel-shaving-packed tanks, beds of stone or gravel or minerals in open ducts or trenches may be employed beneficially to provide mixing. The introduction of a gas, such as natural gas or air, into a tank or pipe in which or through which the mixture of reagent and system is standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively nonprocurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the system to be resolved, frequently has a favorable influence of totally unexpected magnitude. By incorporating the step of subjecting the chemicalized (i.e., containing the reagent) system to the action of air in a sub-aeration type flotation cell, a clear aqueous layer is sometimes obtained in a matter of seconds, without added quiescent settling and with approximately as much reagent. Natural gas was found to be as good a gaseous medium as was air, in this operation.

It should be distinctly understood that such aeration technique, while an important adjunct to the use of the present reagent, in some cases, is not an equivalent procedure. This may be proved by subjecting an un-chemicalized system to aeration for a period of minutes without detectable favorable effect. Addition of the reagent to such aerated system will produce resolution, promptly.

The details of the mechanical structures required to produce aeration suitable for the present purpose need not be given here. It is sufficient to state that any means capable of producing small gas bubbles within the body of the system is acceptable for use.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

Suitable aeration is sometimes obtainable by use of the principle of Elmore, U.S. Pat. No. 826,411. In that ore beneficiation process, an ore pulp was passed through a vacuum apparatus, the application of vacuum liberating very small gas bubbles from solution in the water of the pulp, to float the mineral. A more recent application of this same principle is found in the Door "Vacuator."

The manner of practicing the present invention using aeration is clear from the foregoing description.

The order in which the compositions of this invention and the aeration step are applied is relatively immaterial. Sometimes it is more convenient to chemicalize the system and subsequently to apply the aeration technique. In others, it may be more advantageous to produce a strongly frothing system and then introduce the compositions into such aerated system.

Any desired gas can be substituted for air. Other commonly suitable gases include natural gas, nitrogen, carbon dioxide, oxygen, etc., the gas being used essentially for its levitation effect. If any gas has some deleterious effect on any component of the system, it will obviously be desirable to use instead of some other gas which is inert under the conditions of use.

The amount of compositions of this invention used will vary depending on the particular composition, the particular system, etc. In general, the amount of composition employed in the system is at least about 0.5 ppm, such as from about 1.0 to 60 ppm, for example from about 5 to 40 ppm, but preferably from about 3.0 to 30 ppm. Larger amounts may be used but there is generally no cost/performance reason for so doing.

WEMCO Depurator Flotation Machine is a flotation machine for removal of emulsified oily wastes and suspended solids from petroleum industry wastewater.

The WEMCO Depurator unit employs mechanically-induced air flotation to separate solids, oils, or organic materials from refinery or oil field effluent in larger volumes, in less space, and at lower cost than any other machine. It can clean large quantities of wastewater containing from 200 to 5,000 ppm of oil, depending on the type of oil and emulsion. In most applications, less than 10 ppm of oil remain after a four-minute cleaning cycle.

It is available in a variety of sizes to handle from 1,720 to 171,000 barrels of wastewater per day. Depurator machines can be installed at costs 15–40% less than other comparable flotation equipment. Maintenance costs are lower, too. The Depurator unit also requires at least 50% less space than comparable equipment for its volume capacity. Over 300 successful field installations to date.

WEMCO Depurator units are composed of four standard WEMCO flotation cells. Each cell is equipped with a motor-driven self-aerating rotor mechanism. As the rotor spins, it acts as a pump, forcing water through a disperser and creating a vacuum in the standpipe. The vacuum pulls gas into the standpipe and thoroughly mixes it with the wastewater. As the gas/water mixture travels through the disperser at high velocity, a shearing force is created, causing the gas to form minute bubbles. Oil particles and suspended solids attach to the gas bubbles as they rise to the surface. The oil and suspended solids gather in a dense froth on the surface, are removed from the cell by skimmer paddles and collected in external launders.

In the majority of applications, natural gas or nitrogen is used to form the bubbles. The absence of oxygen prevents the growth of harmful bacteria and also reduces downstream corrosion. A pressure of 0.50 to 1.0 ounce maintains a gas blanket between the liquid level and gas-tight cover. When air is used, it is induced by the Depurator machine at atmospheric pressure. Self-induced mechanical air flotation eliminates need for auxiliary air compressors or blowers.

Processing is often improved with the aid of a chemical injected into the water upstream from the float cell. These compounds break oil-in-water emulsions, gather suspended solids, and stabilize the air bubbles to promote froth flotation.

The Depurator machine consists of a self-supporting, all-steel skid-mounted tank, with integral float-collecting flumes and gas-tight covers. Tank interior is high-temperature epoxy coated for greatest corrosion resistance. Inspection doors are provided on both sides of the tank, plus a breather valve and pneumatic liquid level controller.

Each standpipe is equipped with gas intake ports beneath the gas-tight cover. A separate motor powers each rotor-disperser mechanism. Two ¼ horsepower gearmotors drive the skimmer assemblies. All motors are explosion-proof, 3 phase, 60 cycle, 230/460 volt.

The following are the major petroleum industry applications.

REFINERY PROCESS WATER

At the refinery, the Depurator wastewater treatment generally follows gravity oil-water separation. The wastewater includes process water from desalters, tank and water drawoffs, steam stripping condensate, pump gland cooling, barometric condenser, treating plant wash, caustic treatment, and loading facility washdown. It may also include storm run-off water.

The Depurator device is first choice for secondary wastewater treatment because, unlike gravity oil-water separators, it will break emulsions with appropriate chemical additives. More than a dozen successful installations are currently in refinery operation.

PETROCHEMICAL WASTEWATER

Wastewater created in the production of bulk chemicals derived from natural gas or petroleum is often distinguished from the usual oil refinery product by special characteristics. No single oil/water separation method has proven capable of handling all the compounds produced. The flotation process, as employed by the WEMCO Depurator machine, has proven to be the best wastewater treatment for many of these oils and suspended solids. Bench tests are recommended for each specific application.

BALLAST WATER

Rarely it is possible to discharge water directly into the bay or waterway from ballast water storage tanks. Depurator units take the water from the storage tank and make the precise oil-water separation necessary to meet government clean water standards. Depurator flotation machines effect appropriate content of ballast water to lower levels than any other flotation process.

OIL FIELD PRODUCTION WATER

The Depurator machine wrings almost the final drops of oil from produced water. After initial treatment by gravity oil/water separators, such as free water knockouts, gun barrels and skim tanks, oilfield water can be terminally cleaned to most community and company standards by the WEMCO Depurator machine. Depurator units will remove the emulsified oil left by preliminary water treatment which could prevent formation plugging and reduce pump efficiency when the water is to be reinjected for water flooding. For steam flooding, the Depurator unit is used ahead of boiler pretreatment equipment.

If the wastewater is to be disposed of by percolation ponds, or returned to existing waterways, the Depurator machine has consistently proven its ability to clean the water to local, state and federal standards.

The present invention may be used successfully as a flotation aid with various methods of sewage treatment, such as sludge filtration, or digested sludge filtration, activated sludge, or other methods of sewage treatment in which a settling or filtration step is used.

I claim:

1. Block polymers of polyalkanolamines, wherein each block is a different alkanolamine dehydration condensation product.

2. The block polymers of claim 1 where one block is derived from an ethanolamine and the second block is derived from a propanolamine.

3. The block polymers of claim 2 where one block is derived primarily from triethanolamine and the second block is derived primarily from tripropanolamine.

4. A block polymer of claim 1 where at least one of the alkanolamine moieties contained therein is a mono amine.

5. A block polymer of claim 1 which contains a polyalkanol benzylamine moiety.

6. A block polymer of claim 1 which containsa polyalkanol benzyl amine moiety.

7. A block polymer of claim 1 which contains a polyalkanol polyamine moiety.

8. A block polymer of claim 1 where at least one block is derived from an alkanolamine starting material which contains both ethanol and propanol groups.

9. A composition of claim 1 which is a salt, a quaternary, or a complex.

10. A composition of claim 2 which is a salt, a quaternary, or a complex.

11. A composition of claim 3 which is a salt, a quaternary, or a complex.

12. A composition of claim 4 which is a salt, a quaternary, or a complex.

13. A composition of claim 4 which is a salt, a quaternary, or a complex.

14. A composition of claim 6 which is a salt, a quaternary, or a complex.

15. A composition of claim 7 which is a salt, a quaternary, or a complex.

16. A block polymer of claim 1 where at least one of the alkanolamine moieties contained therein is a polyamine.

17. A block polymer of claim 1 where at least one of the alkanolamine moieties contained therein is a cyclic amine.

18. A composition of claim 16 which is a salt, a quaternary, or a complex.

19. A composition of claim 17 which is a salt, a quaternary or a complex.

* * * * *